(No Model.)
E. H. SMITH.
SAFETY HOOK FOR LIFE LINES.
No. 452,199. Patented May 12, 1891.
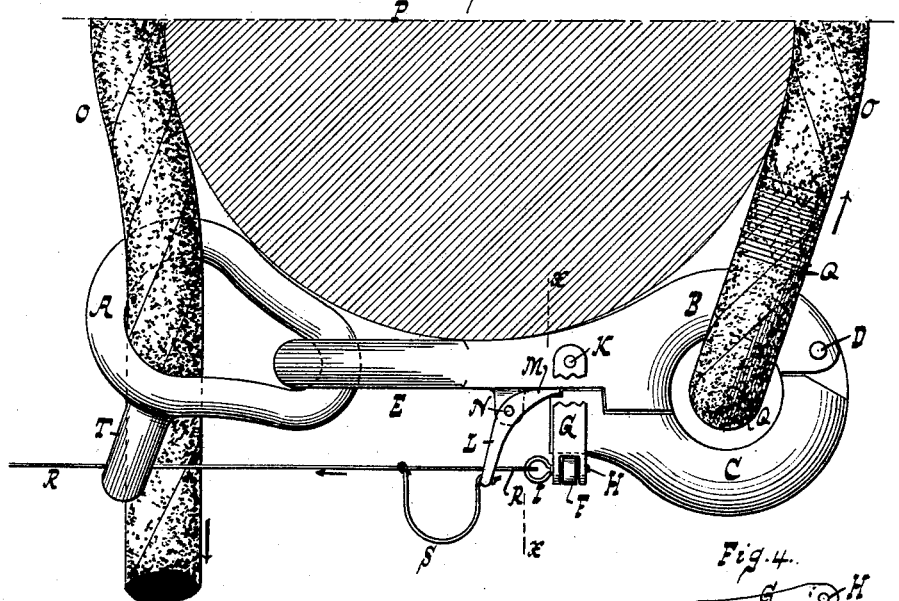
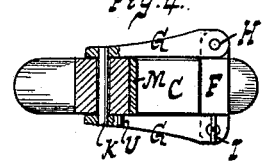
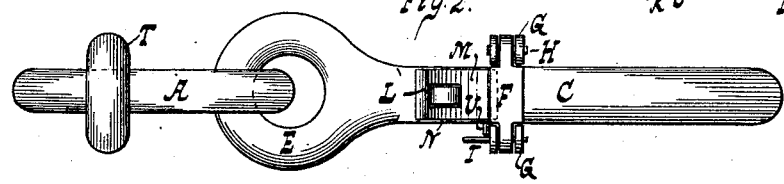
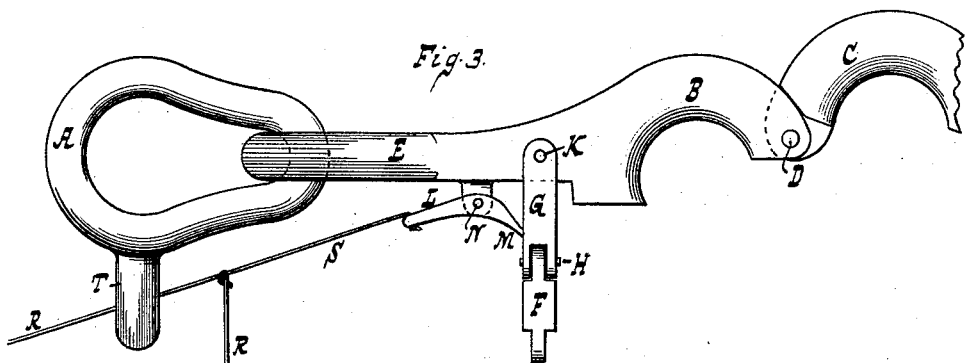
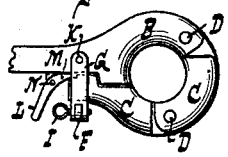
WITNESSES:
William M. Miller
Edward Wolff
INVENTOR:
Edward H. Smith.
BY
Van Santvoord & Hauff
ATTORNEYS
THE NORRIS PETERS CO., PHOTO-LITHO., WASHINGTON, D. C.

UNITED STATES PATENT OFFICE.

EDWARD H. SMITH, OF NEW YORK, N. Y.

SAFETY-HOOK FOR LIFE-LINES.

SPECIFICATION forming part of Letters Patent No. 452,199, dated May 12, 1891.

Application filed January 15, 1891. Serial No. 377,875. (No model.)

*To all whom it may concern:*

Be it known that I, EDWARD H. SMITH, a citizen of the United States, residing at New York, in the county and State of New York, have invented new and useful Improvements in Safety-Hooks for Life-Lines, of which the following is a specification.

This invention relates to an improvement in safety-hooks for life-lines; and the invention consists in the details of construction set forth in the following specification and claims, and illustrated in the annexed drawings, in which—

Figure 1 is a side view of a safety-hook applied to use. Fig. 2 is an edge view of the hook. Fig. 3 shows the hook open. Fig. 4 is a section along $xx$, Fig. 1. Fig. 5 shows a modification.

The safety-hook is shown composed of a primary eye A and a jointed eye or an eye composed of sections B C, jointed to one another at D. A link or eye E connects the eye A with the jointed eye. The jointed eye is held closed by a suitable lock consisting of a brace F. Said brace is supported by two arms G G, on one of which arms said brace swings or to which it is connected by a pivot H. The free end of the brace F is connected to the other arm G by a spring catch or bolt I, passing through suitable eyes in said arm G and in the brace F. The arms G are secured to or supported by a pivot K on the joint eye-section B.

When the catch I is withdrawn, the brace F is free to swing open, Fig. 3, so as to allow the opening-lever L M to swing the link-section C to its open position. This lever L M is fulcrumed at N on the eye-section B, and by suitably pressing or pulling on lever-arm L the arm M, extending into contact with eye-section C, will force said section to its opening position.

In Fig. 1 the device is shown as applied in case of shipwreck. The life-line O is passed through the primary eye A and around the mast P of a vessel. The eye part or looped end Q of the line O is slipped into engagement with the jointed eye B C, which latter eye is then closed and locked. The free end or portion of the line O, extending to shore, will enable suitable connection with the vessel to be made. When all persons have passed from the vessel to the shore, the catch I can be withdrawn by a wire or cord R, extending to the shore, and a cord or wire S, connected to lever-arm L, will at the proper time actuate the lever L M, so that the eye B C will open to release the line O, which can then be hauled on shore, and thus preserved for future use. The releasing-cord is shown guided through a suitable eye T on the primary eye A.

Instead of applying the device as shown in Fig. 1, it is evident that said eye can be applied at other places on the vessel, since, for example, the eye B C can be placed in engagement with any suitable part of the rigging. To prevent the arms G from excessive swinging, a stop V, Fig. 2, is applied. Instead of the jointed eye consisting only of two sections, said eye may be formed of three sections B C C, jointed at D D, as seen in Fig. 5, the remaining construction being otherwise the same as described with reference to Figs. 1, 2, 3, and 4.

Of course I do not limit myself to the use of my device in case of shipwreck only, since my device can be applied on other occasions—as, for example, in the case of fire or in handling or catting anchors or boats.

What I claim as new, and desire to secure by Letters Patent, is—

1. A safety-hook consisting of a primary eye, a link or eye connected with the primary eye and composed of jointed or pivoted sections, arms secured to one of the jointed sections and provided with a locking-brace for securing the other jointed section, and a lever pivoted to one of the sections for forcing the latter apart when the locking-brace is released, substantially as described.

2. A safety-hook consisting of a primary eye, an eye or link engaging the primary eye and comprising jointed or pivoted sections, a pair of arms secured to one of the sections and provided with a locking-brace pivoted to one of the arms, a locking-bolt for detachably securing the opposite end of the locking-brace to the other arm for holding the two jointed or pivoted sections together, and a lever pivoted to one of the sections for forcing the latter apart when the locking-brace is released, substantially as described.

3. A safety-hook comprising an eye E, having jointed or pivoted eye-sections B and C, a pair of arms G, pivoted to one of the eye-sections, a locking-brace F, pivoted to one of the arms and having a detachable connection with the other arm for holding the two eye-sections together, means for releasing the locking-brace, and a lever pivoted to one of the eye-sections and engaging the other eye-section for forcing such sections apart when the locking-brace is released, substantially as described.

4. A safety-hook consisting of a primary eye A, an eye or link E, comprising jointed or pivoted eye-sections, a pair of arms G, pivoted to one of the eye-sections, a locking-brace F, pivoted to one of the arms, a locking-bolt for detachably connecting the opposite end of the locking-brace, a lever L M, pivoted to one of the eye-sections and engaging the other eye-section for forcing such sections apart when the locking-brace is released from the locking-bolt, and a line R, connected with the locking-bolt and with the lever, substantially as described.

In testimony whereof I have hereunto set my hand in the presence of two subscribing witnesses.

EDWARD H. SMITH.

Witnesses:
WM. C. HAUFF,
E. F. KASTENHUBER.